Patented Mar. 11, 1930

1,749,963

UNITED STATES PATENT OFFICE

ERNST VOETTER, OF KONSTANZ, GERMANY, ASSIGNOR TO GENERAL ANILINE WORKS, INC., OF NEW YORK, N. Y., A CORPORATION OF DELAWARE

SULPHUR DYESTUFF PASTE

No Drawing. Application filed February 24, 1928, Serial No. 256,799, and in Germany June 16, 1925.

The present invention relates to homogeneous sulphur dyestuff pastes and to a process of preparing the same.

I have found that homogeneous sulphur dyestuff pastes are obtainable by adding to the press-cake of a sulphur dyestuff an alkaline reacting agent and a carbohydrate capable of being swelled by the action of the said alkaline reacting agent. The new products thus obtainable are distinguished by their property of not depositing water or crystals upon continuous exposure to the atmosphere. Furthermore, no precipitation takes place when sodium sulfide is added to the new sulphur dyestuff pastes in the amount required for the dyeing operation. The new sulphur dyestuff pastes can be employed exactly like the direct dyeing dyestuffs with the addition of salt and sodium carbonate. It is surprising that even with the addition of comparatively large quantities of salt the colloid does not separate out with the formation of flakes. The addition of swollen starch has moreover the advantage that uniform dyeing effects are obtainable especially with dyestuffs which only dye evenly with difficulty and in addition the fibre is less severely treated.

The addition of bactericidal agents, such for example as crude cresol or the sodium salt of toluene sulfochloramide operates to prevent the formation of mildew. The last named agent has at the same time the effect of converting the starch into soluble starch during the heating in the dye-bath. The separation of crystals can be rendered still more difficult by the addition of sulphur, which combines with the alkali sulfide present to form a polysulfide. The addition of hygroscopical substances, such as molasses, glycerine, potassium carbonate and the like, is advantageous in order to counteract the loss due to evaporation of water.

The following examples will illustrate my invention.

*Example 1.*—A paste is made up of the following:—
80 parts of sulphur black paste of a dry content of 50%
5 parts of flour
5 parts of caustic soda solution 40° Bé. and
10 parts of water.

*Example 2.*—A paste is made up of the following:—
50 parts of sulphur black press cake of a dry content of 80%
2.5 parts of wheat starch
35 parts of crystallized sodium sulfide
3 parts of caustic soda solution 40° Bé.
9.45 parts of water and
0.05 parts of sulphur.

*Example 3.*—A paste is made of the following:—
50 parts of sulphur black press cake of a dry content of 80%
2.5 parts of starch
25 parts of sodium sulfide crystallized
5 parts of caustic soda solution 40° Bé.
0.1 parts of sulphur
5 parts of molasses and
32.4 parts of water.

*Example 4.*—A paste is made up of the following:—
50 parts of sulphur black press cake of a dry content of 80%
2.5 parts of starch
50 parts of crystallized sodium sulfide
5 parts of potassium carbonate
0.1 parts of sulphur
0.1 parts of the sodium salt of toluene-sulfo-chloro-amide and
12.3 parts of water.

I claim:—

1. The process for preparing homogeneous sulphur dyestuff pastes, which comprises adding to the press-cake of a sulphur dyestuff a bactericidal agent, an alkaline reacting agent and a carbohydrate capable of being swelled by the action of the said alkaline reacting agent.

2. The process for preparing homogeneous sulphur dyestuff pastes, which comprises adding to the press-cake of a sulphur dyestuff a hygroscopic agent, a bactericidal agent, an alkaline reacting agent and a carbohydrate capable of being swelled by the action of the said alkaline reacting agent.

3. The process for preparing homogeneous sulphur dyestuff pastes, which comprises adding to a press-cake of a sulphur dyestuff an alkaline reacting agent, starch, and the sodium salt of toluene-sulfo-chloro-amide.

4. The process for preparing homogeneous sulphur dyestuff pastes, which comprises adding to a press-cake of a sulphur dyestuff, starch, the sodium salt of toluene-sulfo-chloro-amide, potassium carbonate and crystallized sodium sulfide.

5. The process for preparing homogeneous sulphur dyestuff pastes, which comprises adding to a sulphur black press-cake, starch, crystallized sodium sulfide, potassium carbonate, sulphur and the sodium salt of toluene-sulfo-chloro-amide.

6. As new products, homogeneous sulphur dyestuff pastes containing a bactericidal agent, an alkaline reacting agent and a carbohdyrate capable of being swelled by the action of the said alkaline reacting agent, said dyestuff pastes having the property of not depositing water or crystals upon continuous exposure to the atmosphere.

7. As new products, homogeneous sulphur dyestuff pastes containing a hygroscopic agent, a bactericidal agent, an alkaline reacting agent and a carbohydrate capable of being swelled by the action of the said alkaline reacting agent.

8. As new products, homogeneous sulphur dyestuff pastes containing an alkaline reacting agent, starch, and the sodium salt of toluene-sulfo-chloro-amide, said dyestuff pastes having the property of not depositing water or crystals upon continuous exposure to the atmosphere.

9. As new products, homogeneous sulphur dyestuff pastes containing an alkaline reacting agent, starch, the sodium salt of toluene-sulfo-chloro-amide, potassium carbonate and crystallized sodium sulfide, said dyestuff pastes having the property of not depositing water or crystals upon continuous exposure to the atmosphere.

10. As new products, homogeneous sulphur dyestuff pastes containing an alkaline reacting agent, starch, the sodium salt of toluene-sulfo-chloro-amide, potassium carbonate, sulphur and crystallized sodium sulfide, said dyestuff pastes having the property of not depositing water or crystals upon continuous exposure to the atmosphere.

11. As a new product, the homogeneous paste made up of about 50 parts of sulphur black press-cake of a dry content of about 80%, about 2.5 parts of starch, about 50 parts of crystallized sodium sulfide, about 5 parts of potassium carbonate, about 0.1 part of sulphur, about 0.1 part of the sodium salt of toluene-sulfo-chloro-amide and about 12.5 parts of water.

In testimony whereof I have hereunto set my hand.

ERNST VOETTER.